US007590420B1

(12) United States Patent
Zaghloul et al.

(10) Patent No.: US 7,590,420 B1
(45) Date of Patent: Sep. 15, 2009

(54) INTELLIGENT HOME AGENT SELECTION MECHANISM (IHASM) FOR DYNAMIC HOME AGENT (HA) ASSIGNMENT

(75) Inventors: Said Ismail Said Zaghloul, Lawrence, KS (US); Sudha Sivashanmugam, Overland Park, KS (US); Lei Zhu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 493 days.

(21) Appl. No.: 11/425,631

(22) Filed: Jun. 21, 2006

(51) Int. Cl.
*H04W 4/00* (2006.01)
(52) U.S. Cl. .................. 455/435.2; 370/338
(58) Field of Classification Search .......... 370/231, 370/236, 237; 455/9
See application file for complete search history.

(56) References Cited

U.S. PATENT DOCUMENTS

| | | | | |
|---|---|---|---|---|
| 5,572,221 A | * | 11/1996 | Marlevi et al. | 342/452 |
| 2002/0114323 A1 | * | 8/2002 | Chowdhury et al. | 370/352 |
| 2004/0184420 A1 | * | 9/2004 | Xu et al. | 370/328 |
| 2004/0208187 A1 | * | 10/2004 | Mizell et al. | 370/401 |
| 2006/0218262 A1 | * | 9/2006 | Abeta et al. | 709/223 |
| 2007/0230335 A1 | * | 10/2007 | Sang et al. | 370/230 |

FOREIGN PATENT DOCUMENTS

WO 2004017172 2/2004

OTHER PUBLICATIONS

Vasilache, A; Jie Li; Kameda, H.; "Load balancing policies for multiple home agents mobile IP networks", Dec. 3-6, 2001, IEEE conference proceeding, vol. 2, pp. 178-185.*
Milind Kulkarni, Alpesh Patel, Kent Leung and Cisco Systems Inc., "Mobile IPv4 Dynamic Home Agent Assignment," Mobile IP Working Group, Internet Draft, Jan. 8, 2004.

* cited by examiner

*Primary Examiner*—Lester Kincaid
*Assistant Examiner*—Isaak R Jama

(57) ABSTRACT

A method, system, and medium are provided for an intelligent home agent selection mechanism (IHASM) for dynamic home agent assignment. The present invention has several practical applications in the technical arts including dynamically selecting a HA, determining available HAs in a network, and implementing an HA selection policy. The IHASM solves the redundancy problem in round robin selection methods by using normalized load concepts.

15 Claims, 7 Drawing Sheets

US 7,590,420 B1

INTELLIGENT HOME AGENT SELECTION MECHANISM (IHASM) FOR DYNAMIC HOME AGENT (HA) ASSIGNMENT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Dynamic assignment of Home Address (HoA) and Home Agent (HA) for a mobile station is more than just a desirable or recommended feature for mobile wireless packet data networks. Leading wireless service providers and/or operators have recognized dynamic HoA and HA assignment as a fundamental requirement for their CDMA2000 networks and have emphasized this in multiple conferences world-wide. This has led industry standard organizations like the Internet Engineering Task Force (IETF) and the $3^{rd}$ Generation Partnership Project 2 (3GPP2) to include requirements for dynamic HoA and HA assignment in several of their standards.

While the working mode between the wireless packet data network and the mobile station is well-defined by various standards, the Remote Authentication Dial-In User Service (RADIUS) extension for dynamic HA selection algorithm has not been discussed or defined clearly anywhere. For example, the document CDMA2000 WIRELESS IP NETWORK STANDARD: SIMPLE IP AND MOBILE IP SERVICES, published by the Code Division Multiple Access (CDMA) mobile network standard body 3GPP2, states the following, "The Home RADIUS server shall implement an HA selection algorithm to perform dynamic HA assignment. The implementation details of this algorithm are outside the scope of this document."

To make the Dynamic HA (DHA) assignment an effective and efficient function in networks, an HA selection algorithm can be developed and supported by relevant network elements. Current selection algorithms lack intelligence and do not offer a comprehensive DHA solution. Also, they do not proceed further to explore the potential from both the network and mobile station perspective.

Current HA selection methods in the mobile wireless market today allow the home RADIUS Authentication, Authorization, and Accounting (AAA) server to choose a HA from a predefined subset of HAs, such as an HA group, using a traditional Round Robin (RR) approach, with no proper knowledge of the actual working condition of the HA. Some modified selection methods use an HA monitoring functionality that uses standard protocols, such as Simple Network Management Protocol (SNMP) and RADIUS to monitor the HA operational status that are used to solely trigger pre-defined HA overload policies on the AAA server. The HA can be configured to send traps to the AAA server upon hitting a defined threshold (e.g. overload), or the AAA server can proactively poll the HA for status information. If the AAA server detects that a particular HA is overloaded, it marks that HA as "unhealthy" and starts to either skip requests to the HA (i.e. instead of performing a 1:1 traditional RR between the two HAs in the group, it now does a 1:N RR where N is configurable on the AAA server), or locks out the HA for a configurable period of time (in cases of extreme overload).

All current HA selection methods do not actually avoid an overload condition on the HA, but rather try to deal with it when it happens. RR, if not properly used, may lead to decreasing the HA geographic redundancy level in the network. For instance, if a network had three HAs with one HA' capacity significantly higher than the others, then performing an RR selection will fill-up the capacities of the two smaller HAs and leave the system running with the one larger capacity HA. Another critical problem with current HA selection methods is that the methods do not provide a reasonable balance between delay mitigation, by giving preference to HAs based on geographic proximity, and the current HA load.

For the reasons discussed above, a solution is needed that performs dynamic HA assignment in an intelligent manner so as to take into consideration problematic HAs such as those in an overload or potential overload condition, and takes into consideration other factors such as geographic location and capacities of HAs. The solution should be integrated with the existing RADIUS/AAA infrastructure.

SUMMARY

The presenting invention is defined by the claims below. Embodiments of the present invention solve at least the above problems by providing a system and method for, among other things, an intelligent home agent selection mechanism for dynamic home agent assignment. The present invention has several practical applications in the technical arts including dynamically selecting a HA, determining available HAs in a network, and implementing an HA selection policy.

In a first aspect, an IHASM system for dynamically selecting an HA is provided that includes a monitoring function that operates to acquire data from HAs to either provide samples to a prediction function or provide a health status to a selection function. The prediction function operates to aggregate the samples into data sets to predict a load on the HAs. A policy engine operates to implement instructions based on preferences for a group of HAs to determine a subgroup of HAs. The group of HAs includes the HAs. The selection function operates to receive a predicted load of each HA from the prediction function, to receive the subgroup of HAs from the policy engine, and to receive the health status of an unhealthy HA to select a HA with a minimum predicted load. The unhealthy HA is excluded from a selection process in the selection function.

In another aspect, a computer system having a processor and a memory for executing a method for determining available HAs from a group of HAs is provided that includes determining sessions respectively at HAs by periodically sampling the HAs. Load normalizations are calculated at a sampled time period for the HAs using the sessions respectively assigned to the HAs and capacities for the HAs. Incremental normalized loads are determined. An incremental normalized load represents an incremental increase in a session at an HA. During a time period after the sampled time period but before a next sampled time period, changes are predicted respectively in the load normalizations for the HAs by using past samples for each of the HAs in a prediction method. A subset of the HAs is selected. For each HA, an aggregation of a load normalization, the incremental normalized load, and a predicted change in the load normalization is below a threshold.

In yet another aspect, a computer system having a processor and a memory for executing a method for implementing a home agent (HA) selection policy is provided that includes defining policies in an authentication, authorization, and accounting (AAA) server or an intelligent home agent selection mechanism (IHASM) to select an HA for a data session. Policies are arranged in a preferential structure. Policies are associated with preferred groups of HAs. Policies are arranged into a hierarchy of a most preferred group and respectively have thresholds for execution. A first policy is executed starting with the most preferred group until a first threshold associated with the most preferred group is reached or exceeded. A subsequent policy is executed with a next most preferred group until a next threshold associated with the next most preferred group is reached or exceeded.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
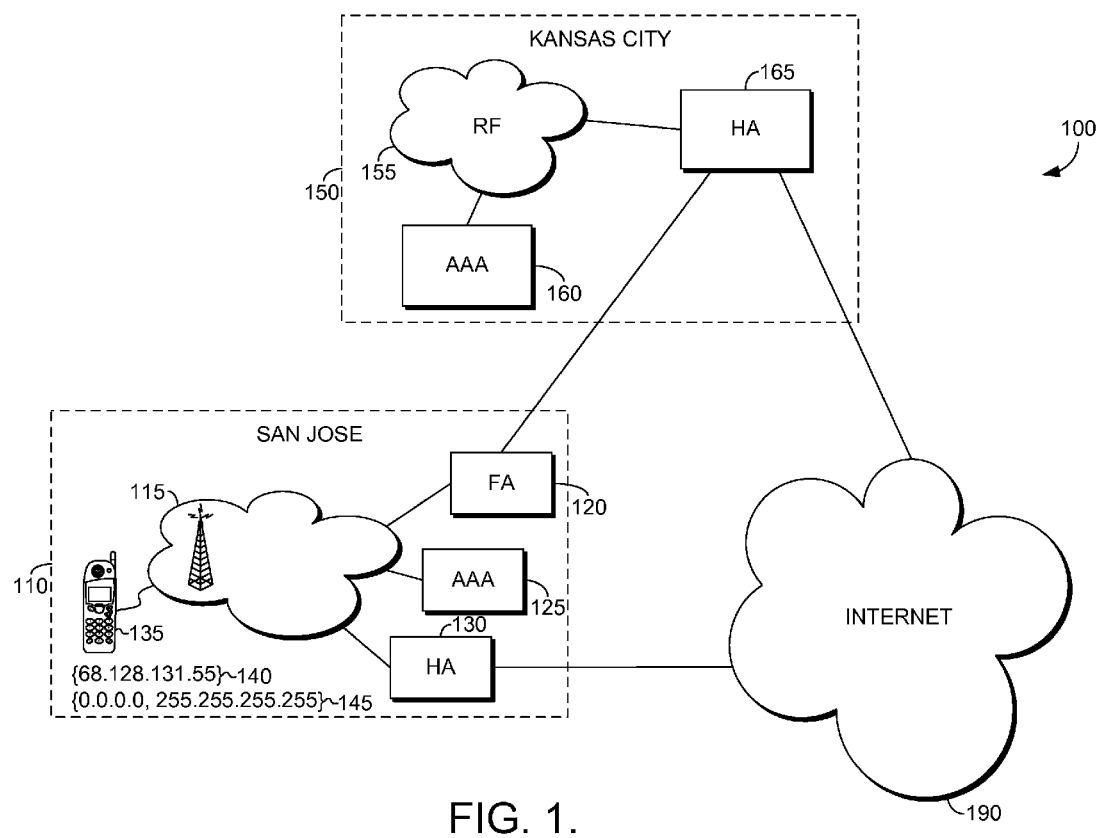
FIG. 1 is a block diagram of an exemplary operating environment illustrating a static HA implementation and a dynamic HA implementation.

Embodiments of the present invention provide systems and methods for an intelligent home agent selection mechanism (IHASM) for dynamic home agent assignment. The IHASM solves the redundancy problem in round robin selection methods by using normalized load concepts.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

3GPP2 Third Generation Partnership Project 2
AAA Authentication, Authorization, and Accounting
CDMA Code Division Multiple Access
FA Foreign Agent
DHA Dynamic Home Agent
HA Home Agent
HoA Home Address
ICMP Internet Control Message Protocol
IETF Internet Engineering Task Force
IHASM Intelligent Home Agent Selection Mechanism
IP Internet Protocol
MIB Management Information Base
MIP Mobile IP
OID Object Identifiers
RADIUS Remote Authentication Dial-In User Service
RF Radio Frequency
SNMP Simple Network Management Protocol Further, various technical terms are used throughout this description. A definition of such terms can be found in *Newton's Telecom Dictionary* by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Intelligent Home Agent Selection Mechanism

An embodiment of the present invention uses the normalized load concept to solve the problems discussed above. It uses the incremental normalized load to assign new users to HAs. It also avoids driving the network into overload by applying multi-step user-defined policies which distribute the load across the network providing a balance between load and round-trip delay. The IHASM uses previous HA load samples (collected periodically through SNMP as one example) to predict the current projected load when making a decision of HA selection for an incoming user or subscriber.

With static HA assignment, the serving foreign agent (FA) node establishes a mobile IP (MIP) tunnel to the HA, whose address is statically configured in the user's mobile device. If the user is roaming away from the user's home area, the static HA assignment approach results in a significant increase in MIP backhaul, thus, introducing the most undesirable elements of network latency, congestion, and inefficient resource utilization. With dynamic HA assignment, this problem can be eliminated, and network reliability can be increased if there exists an HA selection algorithm that can assign the appropriate HA to a user based on a variety of factors, including geography, user type, and HA capacity/load. HAs should effectively be load balanced and there should be no service disruption in the network even under conditions of HA overload and/or failure. The effectiveness of the dynamic HA assignment approach correlates to the efficiency of the HA selection algorithm.

In an embodiment of the present invention, the term HA refers to the function of the home agent rather than it physical device implementation. It is left to the implementer of an embodiment of the present invention to determine the number of independent HA functions that operate on the same physical hardware. For example, a single hardware platform may contain several HA functions, each with its own capacity.

In FIG. 1, an exemplary operating environment 100 is shown with a wireless area 110, a wireless area 150, and the Internet 190. Wireless area 110 includes a radio frequency (RF) area 115, an FA 120, a AAA 125, an HA 130, and a mobile device 135. Mobile device 135 may have IP addresses 140 or 145 encoded into it. Wireless area 150 may be similar to wireless area 110. Wireless area 150 include an RF area 155, a AAA 160, and an HA 165. Both wireless areas 110 and 150 may represent geographic areas such as cities, metropolitan areas, counties, etc. Different components may be included in wireless areas 110 and 150 than those that are shown. For illustrative purposes here, a subset of devices are illustrated to aid in the explanation of the current state of the art as well as the implementation of the present invention. So, for purposes here, wireless areas 110 and 150 are shown connected to Internet 190 through their respective HAs 130 and 165.

As discussed above, a user desiring to connect to Internet 190 with mobile device 135 could do so using a static HA assignment approach. In this case, mobile device 135 might have IP address 140 encoded into it signifying an association with a wireless home area. For our example here, we assume mobile device 135 has wireless area 150 as its home area. Wireless area 150 is identified as Kansas City. Mobile device 135 may represent a user that is traveling in another wireless area, currently wireless area 110, identified as San Jose. The user, with mobile device 135, desires to connect to Internet 190. Because mobile device 135 has IP address 140, wireless area 110 recognizes that mobile device 135 is not one of its own mobile devices. Therefore, FA 120 uses IP address 140 to create a communication tunnel back to mobile device 135's home area to HA 165. HA 165 establishes a connection to Internet 190 to enable mobile device 135 to connect to Internet 190. For purposes here, the explanation of the static HA assignment has been simplified to illustrate the inefficient use of backhauling a connection of a mobile device back to its wireless home area in order to establish a communication connection to the Internet. As can be seen, if thousands of these connections are created, congestion and overload conditions can easily occur across various wireless networks.

Continuing with the example above, a user desiring to connect to Internet 190 with mobile device 135 could also do so using a dynamic HA assignment. In this case, rather than have IP address 140 embedded into mobile device 135, IP address 145 might be embedded into mobile device 135. As shown, IP address 145 illustrates two IP addresses which, if used, would signify to another device that mobile device 135 should not establish a backhaul connection back to its home wireless areas. Instead, the local wireless area should try to establish the necessary connections to enable mobile device 135 to connect to Internet 190. In our scenario, the presence of IP address 145 in mobile device 135 indicates that dynamic HA assignment shall occur. Therefore, FA 120 is not used to create a communication tunnel back to HA 165. Instead, FA 120 interacts with AAA 125 to operate with HA 130 to provide a user with a connection to Internet 190. In this way, FA 120 does not have to make a backhaul connection to mobile device 135's home wireless area before connecting to the Internet.

Figure 2:
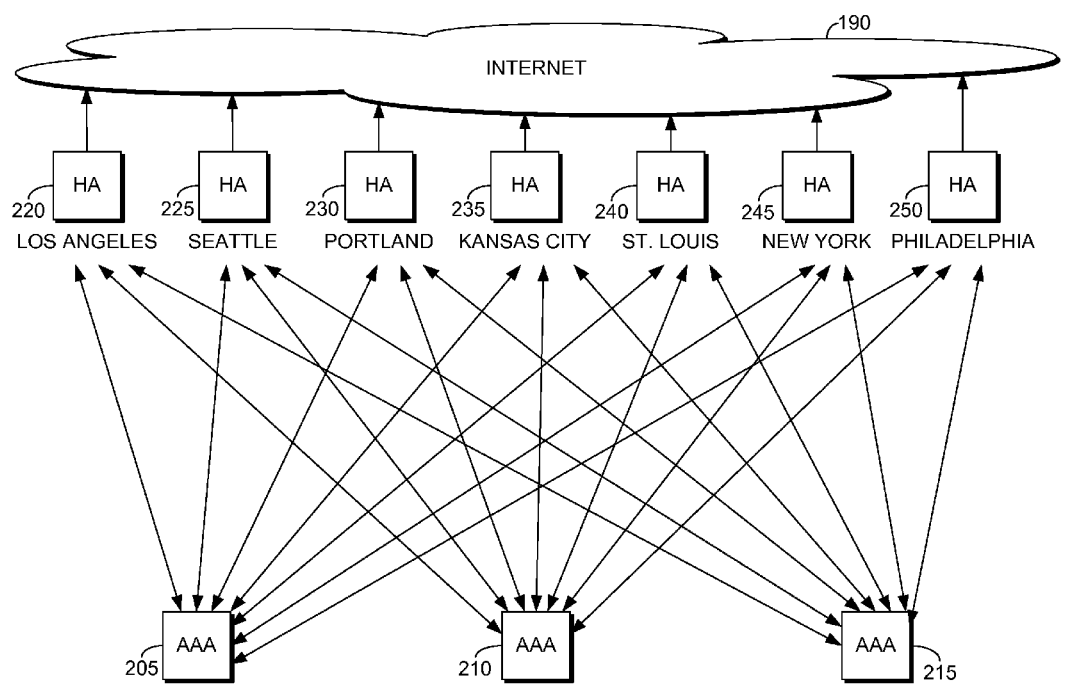
FIG. 2 is a block diagram of an exemplary operating environment of independently operating AAA servers.

Turning now to FIG. 2, an exemplary operating environment 200 is shown with independently operating AAA servers 205, 210, and 215. As their name implies, AAA servers are responsible for authentication, authorization, and accounting of users that desire to connect to Internet 190. AAA servers implement policies, which shall be discussed more later, to assign users to an HA. Operating environment 200 is one example of how dynamic HA assignment may be implemented.

In FIG. 2, AAA server 205 may be located in the west and is illustrated with connections to HA 220, HA 225, and HA 230 identified respectively as Los Angeles, Seattle, and Portland. AAA server 205 also has connections to HAs in the midwest and east. AAA server 210 may be located in the midwest and is illustrated with connections to HA 235 and HA 240 identified respectively as Kansas City and St. Louis. AAA server 210 also has connections to HAs in the west and east. AAA server 215 may be located in the east and is illustrated with connections to HA 245 and HA 250 identified respectively as New York and Philadelphia. AAA server 215 also has connections to HAs in the west and midwest. The idea here is to illustrate that AAA servers may implement policies to assign users to various HAs in a network. The assignment can be made on an equal basis where a AAA server selects equally all available HAs. Or, the AAA server may implement a preferential policy to select HAs that are geographically close to it, and only select other HAs when the preferential policy or most preferred policies have been exhausted or do not meet certain criteria.

For example, AAA server 205 may have a first policy to select HAs 220, 225, or 230, if one of them is available. If they are not available, AAA server 205 may have a second policy to select HAs 235 or 240. If they are not available, AAA server 205 may have a third policy to select HAs 245 or 250. Finally, AAA server 205 might have a fallback policy in case none of the HAs are available or none of the criteria is met. The purpose of such arrangement is to ensure that a user gets connected to Internet 190 while also trying to keep HAs from going into an overload or failure condition. It will be discussed later the various considerations that might make an HA unavailable in the selection process.

One of the drawbacks to operating environment 200 is that AAA servers 205, 210, and 215 may select any HA without regards to each other. This means that two AAA servers may try to select the same HA in certain instances. The result may cause the HA to go into overload if the particular HA is selected more often than one of the other HAs. Another consideration of the issue here is that each HA may have a unique capacity. Therefore, an HA with a smaller capacity may tend to reach overload faster than an HA with a larger capacity. Embodiments of the present invention takes the issues discussed above into consideration during implementation and shall be discussed further below.

Implementations of embodiments of the present invention may use a function-based modular approach for monitoring and selecting an appropriate HA to assign one per user basis. For simplicity of understanding and illustration purposes, a geographical proximity and HA capacity/load is chosen as the primary criteria for HA selection. Of course, the algorithm/model may be expanded to include other HA selection criteria.

To save IP address space, many wireless network service providers implement dynamic HoA assignment, by which the HA manages pools of IP addresses and assigns an IP address to a user's mobile device as part of a MIP registration reply. This assignment uniquely identifies the mobile device in the network. When the HA runs out of IP addresses, it can no longer accept calls and is considered a type of HA failure in the wireless environment. Existing HA solutions are capable of tracking the number of active user sessions in more than one way, including a number of IP addresses in use, and making these numbers available via standard protocol interfaces, like SNMP and RADIUS. Depending on the implementation, the AAA server or any other network element can use such statistics acquired from the HA to perform optimal selections for dynamic HA assignment. This is one basis of the HA selection algorithm implemented in embodiments of the present invention.

Figure 3:
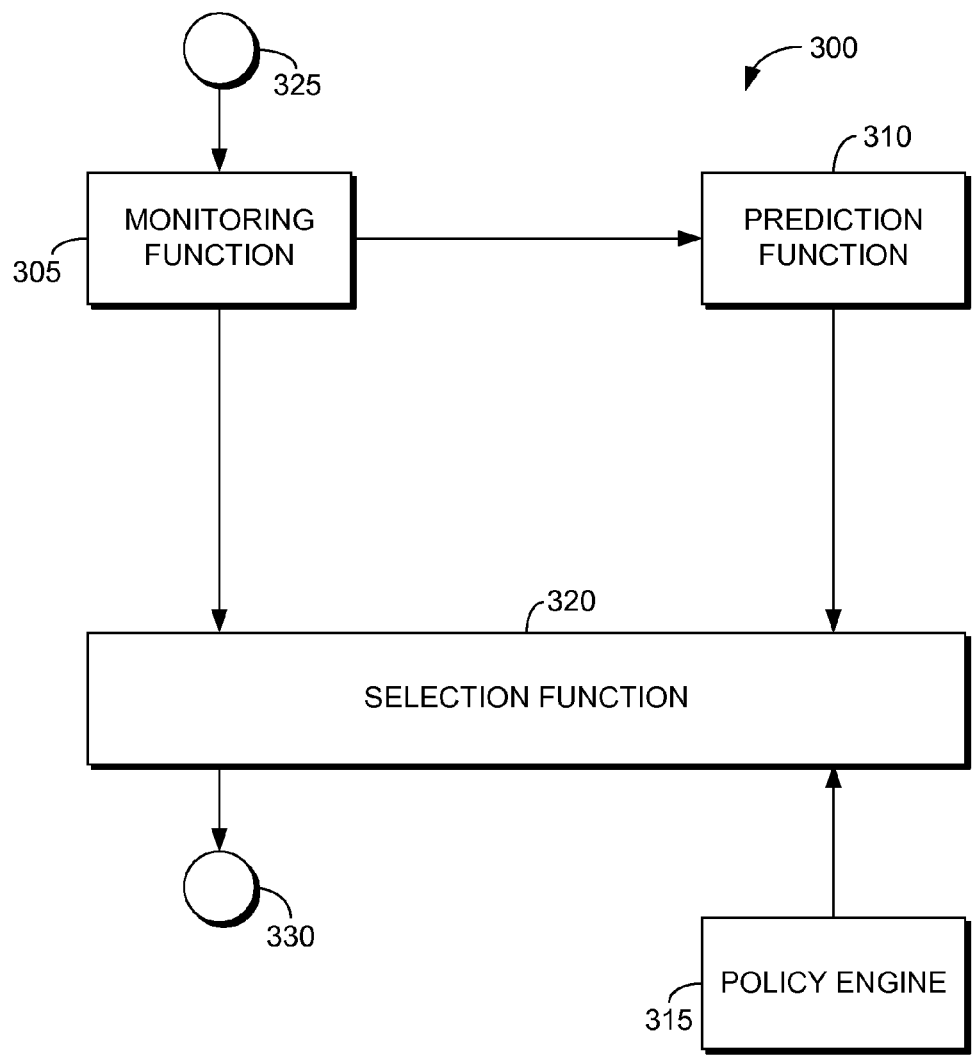
FIG. 3 is a block diagram of an intelligent home agent selection mechanism (IHASM) implemented in an embodiment of the present invention.

In FIG. 3, an intelligent home agent selection mechanism (IHASM) 300 is shown with a monitoring function 305, a prediction function 310, a policy engine 315, a selection function 320, HA statistics 325, and a selected HA 330. HA statistics 325 is connected to monitoring function 305. Monitoring function 305 is connected to prediction function 310 and selection function 320. Prediction function 310 is connected to selection function 320. Policy engine 315 is connected to selection function 320. Selection function 320 is connected to selected HA 330.

Monitoring Function 305 is instrumental in performing the role of data acquisition from the HA. As the name suggests, it monitors the HA and acquires useful statistics, HA statistics 325, such as the number of active subscriber sessions. There are three main ways, currently available to the industry, for monitoring the HA health. They include HA traps, HA polling, and Subscriber Session Start/End messages. Some AAA server vendors are currently capable of performing such monitoring using SNMP traps, SNMP polls, and RADIUS authentication messages.

HA traps can be viewed as warnings or alarms from the HA informing an impending negative condition on the HA, like overload, approaching capacity limit, module failure, etc. In SNMP, such a trap is called the "set" trap. Upon a receipt of a "set" trap, it can be understood that the HA is unhealthy. Immediate and appropriate action should be taken to correct the overload situation and to prevent HA failure. The HA is either made less available, or unavailable (in cases of extreme overload) until the HA sends a "clear" trap, indicating that it is out of danger and is back to its healthy operational state.

With HA polling, monitoring function 305 polls the HA for a configurable set of MIB object identifiers (OID), if using SNMP. A corrective/preventive action may be taken depending on the reported OID values. There are two options available for polling. They include periodic polling and triggered polling.

Periodic polling is where the monitoring function 305 repeatedly polls the HA at specified intervals of time, regardless of the HA state (healthy versus unhealthy). A list of one or more MIB OIDs can be designated to be polled per HA at the same or at varying polling frequencies, depending on the home market.

Triggered polling is typically implemented in conjunction with HA traps or periodic polling. It is initiated as part of an HA load balance action. In triggered polling, monitoring function 305 triggers a poll to the HA outside the specified periodic polling interval in response to an SNMP trap or an unsatisfactory SNMP periodic polling response message. For example, in the event that a clear SNMP trap is not received, monitoring function 305 can trigger a poll to the HA to determine whether the HA is back to a healthy state or not.

With Session Start and End messages, notification of user session start and end via RADIUS accounting start and stop messages is another effective yet chatty means of tracking user sessions on the HA. In this approach, the HA is not polled by monitoring function 305. Rather, user session numbers are maintained per HA at a central node by tracking accounting start and stop messages. This may perhaps be the most accurate method to acquire an exact number of user sessions per HA at a given time. However, this method may not be a preferable choice by many wireless operators due to its high bandwidth or capacity requirements.

It is desirable to implement monitoring function 305 on hardware separate from the AAA server. This not only increases application reliability, but also provides the wireless network operator with the ability to acquire a global view of the entire network at any given time. However, it is possible to implement monitoring function 305 as part of the AAA server.

When monitoring function 305 is implemented on separate hardware as a separate function, the service provider may choose to either centralize or distribute the function across the network. If the function is centralized, a redundancy scheme may be implemented using a (mated) pair or a cluster of servers for increased reliability and fault tolerance. If the function is distributed over multiple servers (residing in different home sites), data may be replicated across overlapping HA zones, where a single HA is on more than one AAA server's candidate list for DHA assignment. The replicated data can then include the number of active sessions and overload/failure conditions per HA, and dynamic HA policy per AAA server.

Continuing with FIG. 3, prediction function 310 gets its feed (polled samples) from monitoring function 305. Feeds are not provided if "Session Start and End Messages" are chosen as the HA monitoring mechanism. Prediction function 310 aggregates the samples into historic data sets that form the basis for modeling subscriber traffic per HA. With this information the load may be predicted on an HA at any given point of time using prevailing techniques for prediction and interpolation. At a sampling time, i.e., every time prediction function 310 receives HA statistics from monitoring function 305, it corrects its prediction, thus, allowing for an adaptive closed-loop (feedback) mechanism. Prediction function 310 is also invoked every time there is a request for dynamic HA assignment.

As discussed earlier for monitoring function 305, prediction function 310 may be implemented along with monitoring function 305 as a separate software module on the same dedicated hardware, which may be centralized or distributed per home site.

Policy Engine 315 is unique to every home AAA server (distribution site) in the network in this embodiment but may be implemented differently in other embodiments. It holds the HA candidate groups for load balancing along with the priorities and overload/failure conditions. A service provider may choose to have one or more HAs in a single group, and associate the highest priority to that group with the closest geographical proximity to the home AAA server. The policies can be defined to be triggered on first-match, in which case, the most preferred HA group must be the first policy line in the engine. In this way, the HA, local or nearest to the home/distribution site, will always be preferred over the others, thus, serving the basic purpose of dynamic HA assignment. This reduces backhaul and inefficient resource utilization.

The service provider can define more than one preferred group of HAs in order of priority. A catch-all policy may be implemented that can enable load balancing among a bigger group (or the largest group) of HAs in the event that all the preferred HA groups are overloaded or have a failure condition. The idea here is to offer the user with at least some service rather than no-service at all.

As policy engine 315 may be unique per AAA server and can be intertwined with the AAA server functionality, policy engine 315 may be implemented on the AAA server itself. However, if a service provider desires to separate the functionality from the AAA server, they can use separate hardware or overlap policy engine 315's functionality with monitoring function 305 and prediction function 310.

Policy engine 315 implements policies using a special condition called "compound overload" per HA group, wherein the number of active user sessions on all HAs within a predefined candidate HA selection group is aggregated. An HA in the most preferred (/available) group may be assigned until the compound sum exceeds a defined threshold. This condition, combined with our effective load balancing algorithm described below, provides an advantage over existing mechanisms. With an implementation of an embodiment of the present invention, the most preferred HA (or group) should not become overstressed allowing an HA from the most preferred group to continue to be assigned for longer durations and higher load conditions than existing HA selection and load balancing algorithms. As discussed above, the current HA selection methods offer a round robin selection, with or without capabilities to skip or lock out the unhealthy HA.

An example of the policies that might be implemented in policy engine 315 is shown as follows:

Line 1: If the projected normalized load of $HA_1$ <40% then the HA selection group is $\{HA_1\}$ Line 2: If the total projected normalized compound load of $HA_1$ and $HA_2$ <60% then the selection group $\{HA_1, HA_2\}$ Line 3: If the total projected normalized compound load of $HA_1$, $HA_2$, $HA_3$, $HA_4$ <80% then the selection group $\{HA_1, HA_2, HA_3, HA_4\}$ Line 4: If the total projected normalized compound load of all HAs in the network <100% then the selection group is all HAs in the network Line 5: Else reject the subscriber call as all HAs are overloaded The multi-line policy example shows how the operator may configure a per site policy that gradually distributes the users (load) across neighboring HAs. It uses a much bigger list of HAs (the entire list in the network, in this case) as a last resort in order to avoid extreme overloading of the nearby sites.

The basic concept behind compound load is to simply visualize multiple HAs as if they were one HA. This method provides a solution for reacting to sudden HA failures and/or overload using the same policy. For example, line 2 instructs the selection function to load balance between $HA_1$ and $HA_2$ until the projected compound load exceeds 60%. Note that this policy is evaluated independently for each incoming user, which is beneficial in the case when the network recovers (load decreases) as new user requests can immediately benefit from an improved network situation.

The compound load method solves the problem of HA failure when an overload policy is triggered. For example, if the compound load of $HA_1$, $HA_2$, $HA_3$, and $HA_4$ is less than 80% then the selection function will keep using line 3 even if $HA_3$ becomes unavailable avoiding the need for defining endless conditional statements to handle HA overload/failure scenarios during overload. This function is unique to the proposed solution. Existing solutions do not support compound load balancing and hence widely limit the operator's ability to granularly control the load across the network.

Selection Function 320 is the core of the proposed model. Selection function 320 is invoked to make the best HA selection every time there is a dynamic HA assignment request sent to the AAA server as part of the RADIUS Access Request message. Selection function 320 selects the most appropriate HA based on a number of feeds provided by the other functions discussed above.

At any given point of time, selection function 320 is aware of the normalized load per HA. It knows the unit change in load, caused by the addition of a single user session, per HA to be able to compute the new load on the HA. It combines these numbers with the predicted/interpolated load made available by prediction function 310 per HA, and applies them to the candidate HA selection list, proposed by policy engine 315. Selection function 320 selects the HA associated with the minimum (predicted) load. In the event of an HA "set" trap, it eliminates the HA from the candidate list until monitoring function 305 reports a healthy HA state, either based on a "clear" trap from the HA or a triggered poll result.

Mathematical equations may be used to elaborate on the HA selection algorithm used by selection function 320.

The number of active subscriber sessions per HA may be maintained using a columnar vector H defined as, $$H = [h_1 h_2 h_3 \ldots h_n] \quad (1)$$

where $h_i$ represents the number of sessions on the $i^{th}$ HA, and the maximum capacity per HA (as viewed by the selection function 320) by another columnar vector C, defined as, $$C = [c_1 c_2 \ldots c_n] \quad (2)$$

where $c_i$ represents the number of sessions on the $i^{th}$ HA. It follows that the current normalized load per HA load can be represented by another columnar vector L as, $$L = H./C \quad (3)$$

where ./ indicates element by element division.

The normalized unit load change (i.e., the per HA load change due to the addition of a single user session) can be derived from (2) and can be written as, $$\Delta L = [c_1^{-1} c_2^{-1} \ldots c_n^{-1}] \quad (4)$$

Let H' be a subset of H representing HA elements that are eligible candidates for the selection, as dictated by policy engine 315, the policy profile, and the candidate HA selection group being unique to the AAA server. Let C', L' and ΔL' be the corresponding quantities for the elements defined in H'. In order to determine the appropriate HA given a profile set, selection function 320 computes α, representing the minimum loaded HA in the candidate group.

$$\alpha = \min(L' + \Delta L') \quad (5)$$

The algorithm is not complete at this point. Selection function 320 cannot simply assign the chosen HA based on the historical number of user sessions maintained in vector H assuming that it is still the minimum loaded HA. It could be minutes past the previous sampling (HA polling), and the data traffic rate may be highly variable. An unknown number of users may have entered/left the network and at the given instant, the exact load on the HA would be unknown. While "Session Start and Stop messages" could be used as a means of tracking the exact number of user sessions on the HA, it is a chatty approach that may not hold good under all conditions and may not be possible to implement in all networks. Hence, prevalent and popular prediction/interpolation techniques are employed to calculate the change in load vector per HA since the previous sampling time.

Considering each poll as a sample, each $h_i$ described in (1) may be broken into N samples ($X_i$) separated by the sampling time ($T_s$) as, $$h_i = [X_N X_{N-1} \ldots X_1] \quad (6)$$

If ΔP(t) represents the predicted change in load vector of the number of users from the last sample vector $X_N$ (for all HAs) until a new user requests to join the data network at time t $$\Delta P(t) = [\Delta P_1 \Delta P_2 \ldots \Delta P_N]$$

$$0 \leq t < T_S \quad (7)$$

and ΔP' is the per profile prediction, equation (5) can now be modified as, $$\alpha = \min(L' + \Delta L' + \Delta P') \quad (8)$$

Selection function 320 should take place based on properly operating HAs. If any HA goes down for any reason then it should not be considered for selection. Thus, if one assumes that a simple ICMP echo reply (keepalive) packet is received in response to every ICMP echo request packet that is sent multiple times within one $T_s$ period, an HA outage may be accounted for by simply redefining $h_i$ as $\hat{h}_i$ as follows, and incorporating $\hat{h}_i$ in equation (1).

$$\hat{h}_i = \begin{cases} h_i & \text{Keepalive arrives or ClearTrap} \\ c_i & \text{Keepalives lost or SetTrap} \end{cases} \quad (9)$$

Thus, our HA selection algorithm makes optimal HA selection among the candidate most preferred group of HAs enforced by policy engine 315 per AAA server, based on normalized and interpolated load metrics per HA. It also uses keepalives and traps to ensure that the HA is alive. Obviously, this does not account for a failed link between an FA and an HA, unless the HA uses the same interface to connect to both selection function 320 and FA.

Continuing with FIG. 3, an insight into a sample prediction technique that can be integrated into the HA selection algorithm is discussed. One exemplary technique is called the YULE-WALKER PURE PREDICTION METHOD described in K. SAM SHANMUGAN, ARTHUR M. BREI-POHL, RANDOM SIGNALS: DETECTION, ESTIMATION AND DATA ANALYSIS (Wiley, May 1988) which is herein incorporated by reference. Other advanced prediction methods like the Kalman Predictor may be considered depending on the network and/or application. It is up to the implementer to decide on a particular prediction method to use.

Using Yule-Walker method, if the last M samples to predict $X_{N+1}$ are used then, $$X_{N+1} = k_0 + k_1 X_N + k_2 X_{N-1} + \ldots + k_M X_{N-M-1} \quad (10)$$

where the $k_i$ factors are obtained by solving equation (11) as follows, $$\begin{bmatrix} k_1 \\ k_2 \\ \vdots \\ k_M \end{bmatrix} = \begin{bmatrix} R_{SS}(1) \\ R_{SS}(2) \\ \vdots \\ R_{SS}(M) \end{bmatrix} \begin{bmatrix} R_{SS}(0) & R_{SS}(1) & \ldots & R_{SS}(M-1) \\ R_{SS}(1) & R_{SS}(0) & \ldots & R_{SS}(M-2) \\ R_{SS}(2) & R_{SS}(1) & R_{SS}(0) & \vdots \\ R_{SS}(M-1) & R_{SS}(M-2) & \ldots & R_{SS}(0) \end{bmatrix}^{-1} \quad (11)$$

where, $$R_{SS}(0) = \sigma_{ss} + \mu_s^2$$

$$R_{SS}(j) = E\{X(n)X(n+j)\}$$

$R_{ss}$ is the autocorrelation function for $h_i$ random variable, $\mu_s$ is the mean number of sessions per HA, and $\sigma_{ss}$ is the variance of $h_i$. Since the real per HA traffic probability density function may not be known, one may collect a large number of samples (φ) to be able to estimate $R_{SS}$, $\sigma_{ss}$, and $\mu_s$ as shown in equation (12), $$\mu_s = \frac{1}{\phi} \sum_{i=0}^{\phi-1} x(i) \quad (12)$$

$$\sigma_{ss} = \frac{1}{\phi} \sum_{i=0}^{\phi-1} [x(i) - \mu]^2$$

$$R_{ss}(j) = \frac{1}{\phi - j} \sum_{i=0}^{i=\phi-j-1} x(i)x(i+j)$$

$$R_{ss}(-j) = R_{ss}(j)$$

Thus, in this method, φ samples are collected and then the last M samples are used to estimate the next sample $X_{n+1}$. Once $X_{n+1}$ is estimated, one can use interpolation to estimate the current number of sessions $X_t$. For example for linear interpolation, $$X_t = X_n + \frac{t}{T_s}[X_{n+1} - X_n] \quad (13)$$

Figure 4:
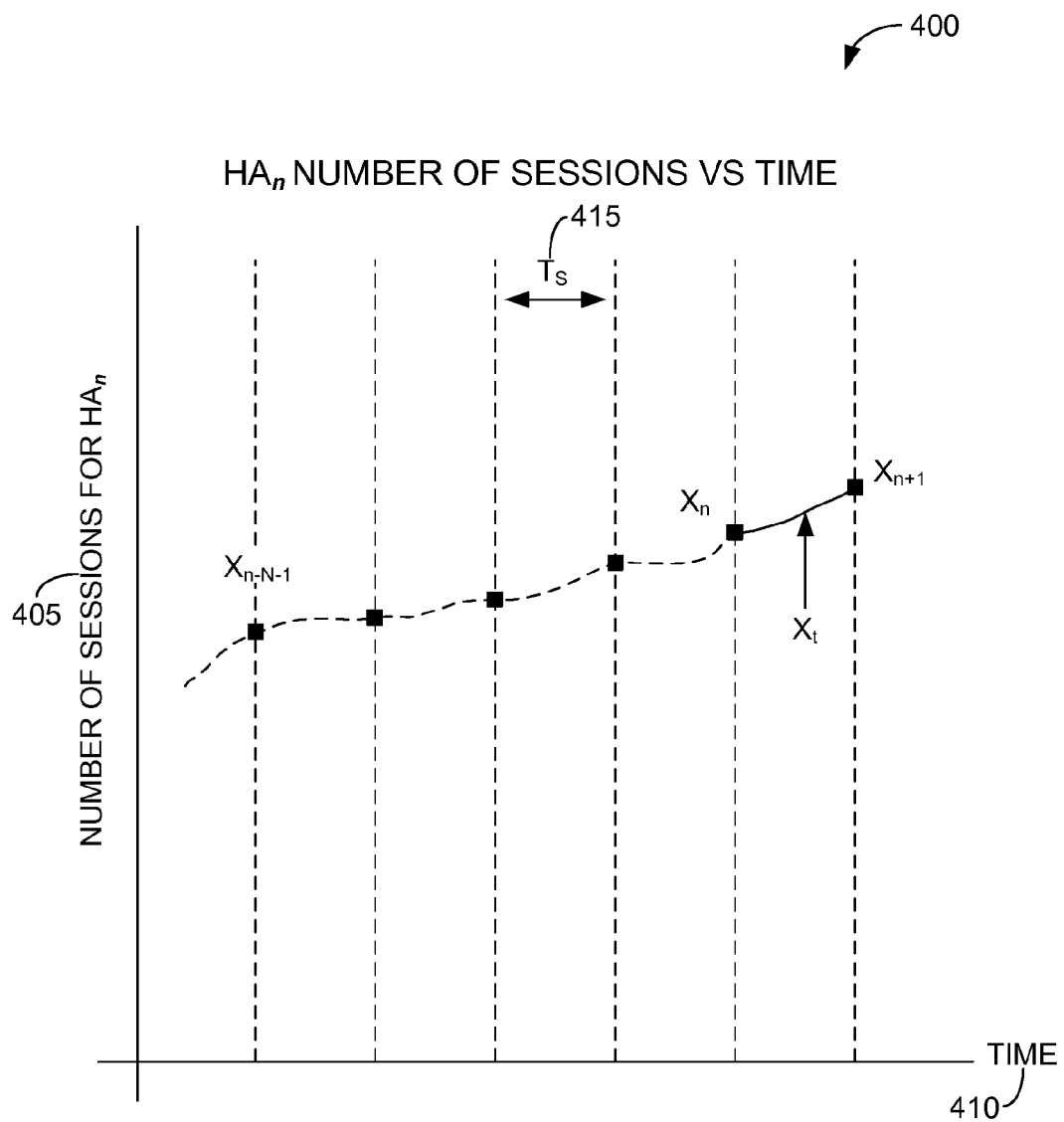
FIG. 4 is an exemplary graph of a prediction operation created from an implementation of an embodiment of the present invention.

Again, the choice of the interpolation method as well as the prediction method may vary and it is left to the implementer to select the most appropriate method. FIG. 4 illustrates the prediction operation.

The predicted change in load vector described by equation (7) can thus be derived by, $$\Delta P_{t,i} = \frac{X_{t,i} - h_i}{C_i} \quad (14)$$

In FIG. 4, a graph illustrating a prediction operation 400 is shown illustrating a number of sessions 405 plotted for time 410. Each session 405 is plotted for a sampled time period 415. The past samples are used to predict the number of new sessions that may occur.

In practice, wireless operators tend to partition their HAs into groups based on geographic distance, expected load, etc. It can be noted that the partitioning operation (denoted by the ' sign above) changes per AAA server (distribution site) policy. Policies should be applied before selection. The following is an example policy,

[λ(1)<35%]→I={1}

[λ(1,2)<70%] or [λ(1)<60%]→I={1,2}

[λ(1,2,3,4)<80%] or [λ(1)<90%]→I={1,2,3,4}

λ(1,2,3,4, ..., N)<100% →I={1,2,3,4, ..., N}

Reject where $$\lambda(1, 2, \ldots, k) = \frac{\sum_{i=1}^{k} X_{t,i}}{\sum_{i=1}^{k} C_i}$$

is the compound overload function and I defines the HA indices to be used when applying the partitioning operation before selection.

Figure 5:
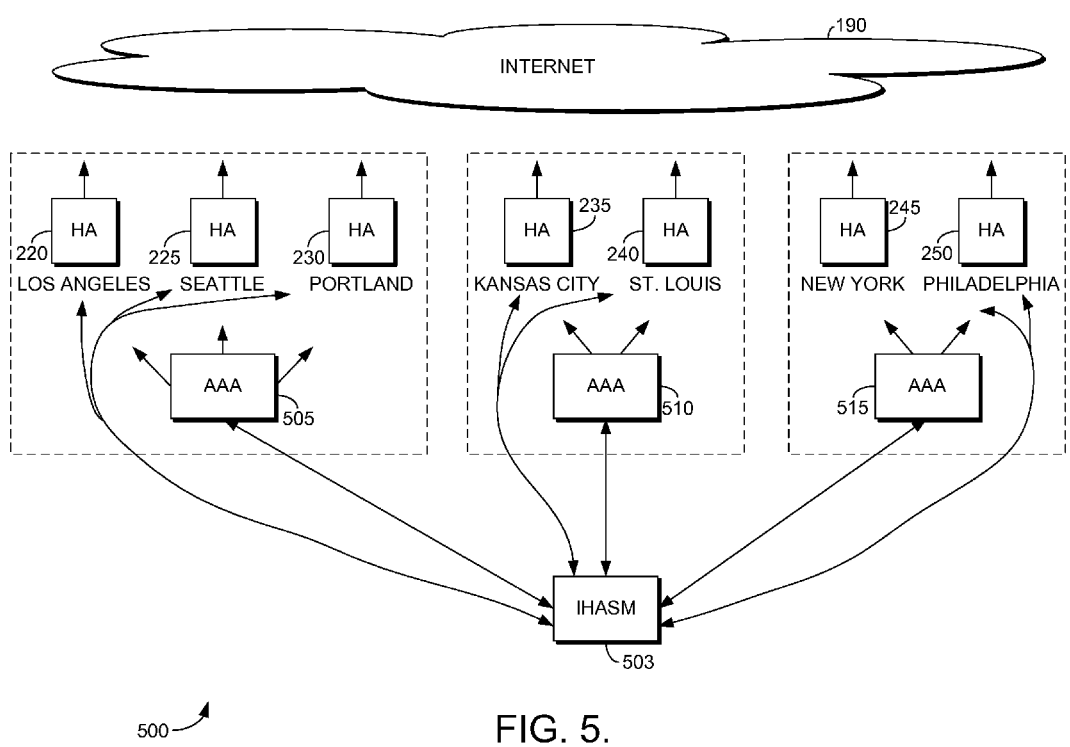
FIG. 5 is a block diagram of an exemplary operating environment illustrating an implementation of an embodiment of the present invention.

With the foregoing discussion, FIG. 5 illustrates an operating environment 500 implemented showing an IHASM 503 connected to various devices including AAA server 505, 510, and 515, HAs 220, 225, 230, 235, 240, 245, and 250. Operating environment 500 illustrates an embodiment of the present invention whereby IHASM 503 is separate from AAA server 505, 510, and 515. However, another embodiment could integrate IHASM 503 and the AAA servers. Also, another embodiment could implement the HA selection method in a different manner than shown whereby different AAA servers could be associated with different HAs, IHASM 503 could implement different policies, or different prediction methods could be implemented.

FIG. 5 may be contrasted with FIG. 2. As shown in FIG. 5, the AAA servers are relieved of certain responsibilities which have been placed in IHASM 503. The AAA servers no longer would have to know about the entire network of HAs but only work with a selected group of HAs. This would aid in reducing potential overload conditions at an HA by spreading the load around to different HAs. IHASM 503 provides geographic redundancy by directing traffic to the HAs based on the current normalized loads. This helps deals with HAs of varying capacities by favoring HAs with more available capacity.

Figure 6:
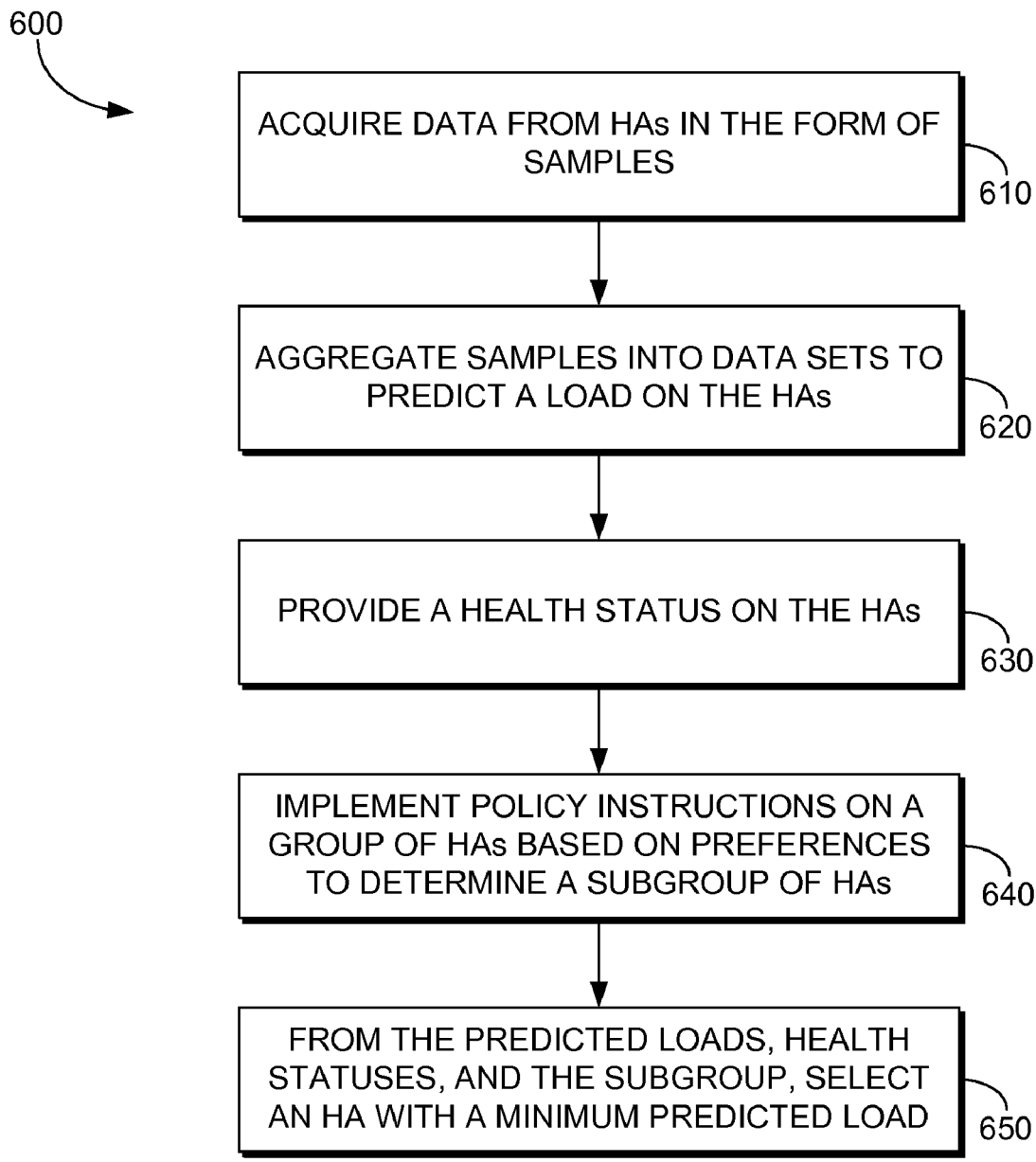
FIG. 6 is a flowchart of an exemplary process for selecting an HA when implementing an embodiment of the present invention.

Turning now to FIG. 6, a process for selecting an HA is shown in a method 600. In a step 610, data is acquired from the HAs in the form of samples as shown in HA statistics 325.

In a step 620, the samples are aggregated into data sets to predict a load on the HAs. Step 620 may occur in monitoring function 305 and prediction function 310. In a step 630, a health status on the HAs is provided from monitoring function 305 to selection function 320. In a step 640, policy instructions in policy engine 315 are implemented on a group of HAs based on preferences. The result is to determine a subgroup of HAs. In a step 650, an HA with a minimum predicted load is selected in selection function 320 using the predicted load, health status, and the determined subgroup.

Figure 7:
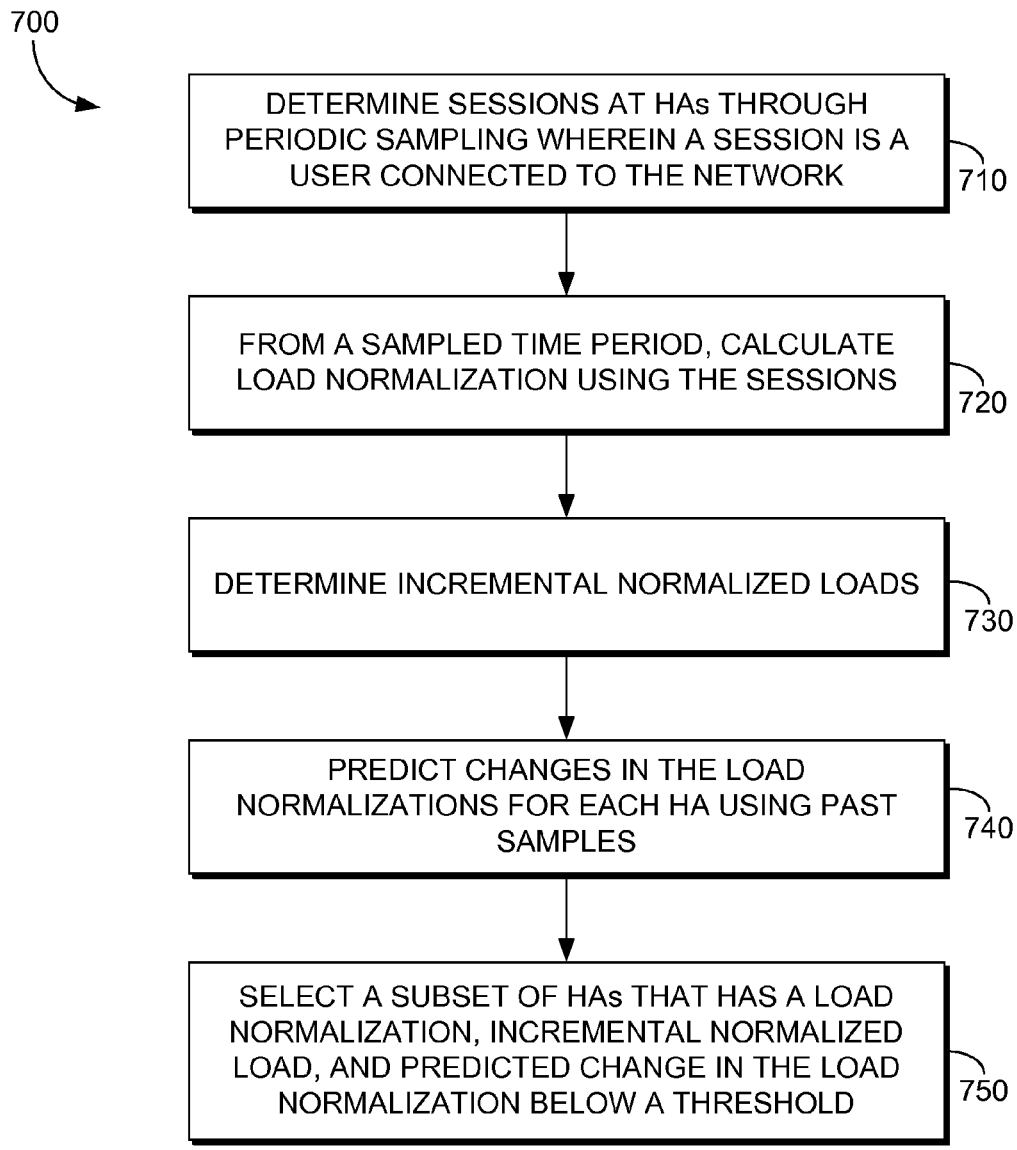
FIG. 7 is a flowchart of an exemplary process for determining available HAs when implementing an embodiment of the present invention.

In FIG. 7, a process for determining available HAs is shown in a method 700. In a step 710, sessions are determined at the HAs through periodic sampling. A session is identified as a user connected to the network or Internet 190. In a step 720, from a sampled time period, load normalizations are calculated using the sessions. In a step 730, incremental normalized loads are determined. An incremental normalized load is one user added to the network. In a step 740, changes in load normalizations are predicted for each HA using past samples. Various prediction methods may be used to estimate the changes. In a step 750, a subset of HAs is selected that have load normalizations, incremental normalized loads, and predicted changes in the load normalizations below a threshold. The aggregate of these amounts indicate that the subset would represent HAs that are not in an overload or failure condition. The threshold represents an amount that might place an HA in an overload or failure condition, or at least close to it.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. An IHASM system for dynamically selecting a home agent (HA), comprising:

a monitoring function connected to a prediction function and a selection function, the prediction function connected to the selection function, a policy engine connected to the selection function, and the selection function connected to one or more HAs;

the monitoring function operable to acquire data from the one or more HAs to at least one of provide a number of user sessions from the one or more HAs to the prediction function and provide a health status of the one or more HAs to the selection function wherein the health status is a set of SNMP traps, SNMP polls, or RADIUS authentication messages;

the prediction function operable to aggregate the number of user sessions into one or more data sets to model user traffic patterns at the one or more HAs and to predict a load capacity on the one or more HAs;

the policy engine operable to implement a set of instructions based on a set of preferences for a group of HAs to determine a subgroup of HAs wherein the group of HAs includes the one or more HAs; and the selection function operable to receive a predicted load capacity of each HA from the prediction function, to receive the subgroup of HAs from the policy engine, to receive the health status of an unhealthy HA, and to select an HA with a smallest predicted load capacity from the predicted load capacity of each HA wherein the unhealthy HA is excluded from a selection process in the selection function.

2. The system of claim 1, wherein the monitoring function resides in at least one of a separate hardware or a AAA server.

3. The system of claim 1, further comprising re-modeling user traffic patterns at the one or more HAs and predicting another load capacity on the one or more HAs after receiving an updated number of user sessions.

4. The system of claim 1, wherein a selection of the HA is based on a set of criteria.

5. A computer system having a processor and a memory, the computer system operable to execute a method for determining one or more available HAs from a group of HAs, comprising:
    counting users respectively at one or more HAs by periodically polling the one or more HAs;
    calculating at a time period one or more load normalizations for the one or more HAs using the users respectively assigned to the one or more HAs and one or more load capacities for the one or more HAs;
    determining one or more incremental normalized loads wherein an incremental normalized load represents an addition of a user at an HA;
    during a time period after the time period but before a next time period, predicting one or more changes respectively in the one or more load normalizations for the one or more HAs by using one or more past load normalizations for each of the one or more HAs in a prediction method; and
    selecting a subset of the one or more HAs wherein for each HA, an aggregation of 1) a load normalization, 2) the incremental normalized load, and 3) a predicted change in the load normalization are below a threshold.

6. The system of claim 5, wherein the threshold is selected from a group including an operable amount and a capacity limit.

7. The system of claim 5, further comprising excluding from the subset an unhealthy HA wherein the unhealthy HA is selected from a group including an overloaded HA, an HA with a failure, an HA experiencing an outage, and an HA sending a warning or an alarm.

8. The system of claim 5, wherein a load normalization is a total number of sessions at an HA divided by a capacity of the HA.

9. The system of claim 5, wherein one or more HA functions reside in the HA.

10. One or more computer-readable media having instructions stored thereon for performing the system of claim 5.

11. A computer system having a processor and a memory, the computer system operable to execute a method for implementing a home agent (HA) selection policy, comprising:
    defining a set of policies that implement compound load balancing in an authentication, authorization, and accounting (AAA) server or an intelligent home agent selection mechanism (IHASM) to select an HA for a data session;
    arranging the set of policies in a preferential structure to achieve the compound load balancing wherein one or more policies are associated with one or more preferred groups of HAs wherein the one or more policies are arranged into a hierarchy of a most preferred group and respectively have one or more thresholds for execution;
    executing a first policy starting with the most preferred group until a first threshold associated with the most preferred group is reached or exceeded; and
    executing a subsequent policy with a next most preferred group until a next threshold associated with the next most preferred group is reached or exceeded.

12. The system of claim 11, wherein the IHASM is selected from a group including a computing software with a policy engine and a computer hardware with a policy engine.

13. The system of claim 12, wherein the IHASM operates within the AAA server.

14. The system of claim 11, further comprising a default policy to enable connecting a user to an HA for the data session.

15. One or more computer-readable media having instructions stored thereon for performing the system of claim 11.

* * * * *

UNITED STATES PATENT AND TRADEMARK OFFICE
CERTIFICATE OF CORRECTION

PATENT NO. : 7,590,420 B1  Page 1 of 1
APPLICATION NO. : 11/425631
DATED : September 15, 2009
INVENTOR(S) : Zaghloul et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 579 days.

Signed and Sealed this

Twenty-first Day of September, 2010

David J. Kappos
*Director of the United States Patent and Trademark Office*